United States Patent
Chen et al.

(10) Patent No.: US 11,391,844 B2
(45) Date of Patent: Jul. 19, 2022

(54) DETECTION AND TRACKING OF ROAD-SIDE POLE-SHAPED STATIC OBJECTS FROM LIDAR POINT CLOUD DATA

(71) Applicants: Andrew Chen, Troy, MI (US); Zijian Wang, Troy, MI (US)

(72) Inventors: Andrew Chen, Troy, MI (US); Zijian Wang, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 207 days.

(21) Appl. No.: 16/224,964

(22) Filed: Dec. 19, 2018

(65) Prior Publication Data
US 2020/0200912 A1    Jun. 25, 2020

(51) Int. Cl.
| | |
|---|---|
| *G01S 17/931* | (2020.01) |
| *G01S 17/89* | (2020.01) |
| *G01S 7/48* | (2006.01) |
| *G06K 9/00* | (2022.01) |
| *B60W 30/08* | (2012.01) |
| *G06V 20/58* | (2022.01) |

(52) U.S. Cl.
CPC ........... *G01S 17/931* (2020.01); *B60W 30/08* (2013.01); *G01S 7/4808* (2013.01); *G01S 17/89* (2013.01); *G06V 20/58* (2022.01); *G06V 20/582* (2022.01); *B60W 2420/52* (2013.01); *G06T 2207/10028* (2013.01)

(58) Field of Classification Search
CPC ...... G01S 17/931; G01S 17/89; G01S 7/4808; B60W 30/08; B60W 2420/52; G06K 9/00818; G06K 9/00805; G06T 2207/10028; G06V 20/58; G06V 20/582
See application file for complete search history.

(56) References Cited

U.S. PATENT DOCUMENTS

| | | | |
|---|---|---|---|
| 6,687,577 B2 | 2/2004 | Strumolo | |
| 8,244,026 B2* | 8/2012 | Nahari | G06K 9/0063 382/154 |
| 8,396,293 B1* | 3/2013 | Korah | G06K 9/0063 382/171 |

(Continued)

OTHER PUBLICATIONS

Huang, Jing, et al., "Pole-Like Object Detection and Classification from Urban Point Clouds", p. 1-7.

(Continued)

*Primary Examiner* — Fadey S. Jabr
*Assistant Examiner* — Omar K Morsy
(74) *Attorney, Agent, or Firm* — Ralph E. Smith

(57) ABSTRACT

Systems and methods of detecting and tracking a pole-shaped object proximate to a vehicle comprise down-sampling three-dimensional (3D) light detection and ranging (LIDAR) point cloud data for each of a plurality of frames according to a user-configurable voxel size, filtering the down-sampled 3D LIDAR point cloud data to remove data points corresponding to ground surface reflections, dividing the 3D LIDAR point cloud data into a plurality of clusters that are parallel to the vehicle's moving direction, projecting the plurality of clusters to a plane that is parallel to sides of the vehicle to generate an image, detecting a pole-shaped object in the image, and tracking the pole-shaped object by deep sorting across multiple frames of the plurality of frames.

20 Claims, 4 Drawing Sheets

(56) References Cited

U.S. PATENT DOCUMENTS

| | | | |
|---|---|---|---|
| 10,444,759 B2* | 10/2019 | Douillard | G06K 9/00791 |
| 10,627,521 B2* | 4/2020 | Englard | B60W 50/06 |
| 10,705,534 B2* | 7/2020 | Kim | G08G 1/166 |
| 2017/0082750 A1 | 3/2017 | Schultz et al. | |
| 2018/0188038 A1* | 7/2018 | Yang | G01C 21/3635 |
| 2019/0132696 A1* | 5/2019 | Jiang | H04W 4/023 |
| 2020/0003888 A1* | 1/2020 | Fujitsu | G01S 13/726 |

OTHER PUBLICATIONS

Li, Dan, "Optimising Detection of Road Furniture (Pole-like Objects) in Mobile Laser Scanner Data", p. 1-56, Enschede, The Netherlands (2013).

Ordonez, Celestine, et al., "Automatic Detection and Classification of Pole-Like Objects for Urban Cartography Using Mobile Laser Scanning Data", www.mdpi.com/journal/sensors, vol. 17, 1465, doi: 10.3390 (2017).

Wojke, Nicolai, et al., "Simple Online and Realtime Tracking with a Deep Association Metric", PowerPoint Presentation, p. 1-15.

* cited by examiner

DETECTION AND TRACKING OF ROAD-SIDE POLE-SHAPED STATIC OBJECTS FROM LIDAR POINT CLOUD DATA

FIELD

The present application generally relates to vehicle advanced driver assistance systems (ADAS) and, more particularly, to techniques for detecting and tracking roadside pole-shaped static objects from light detection and ranging (LIDAR) point cloud data.

BACKGROUND

Some vehicle advanced driver assistance systems (ADAS) utilize radio detection and ranging (RADAR) and/or camera systems to detect and track objects. Some types of objects, however, are difficult for these systems to accurately detect and track. One example of such a type of object is a tall, thin pole-shaped object (a light/utility pole, a traffic sign, a tree, etc.). Pole-shaped objects are also static, which allows their location to be utilized to localize the vehicle's position, such as on a global positioning system (GPS) map. Due to the shape and characteristics of pole-shaped objects, RADAR systems are unable to capture a sufficient amount of reflected radio waves for pole-shaped objects. For the same reasons, camera systems are also unable to capture depth and distance information for pole-shaped objects. Accordingly, while such ADAS pole-shaped object detection and tracking systems work for their intended purpose, there remains a need for improvement in the relevant art.

SUMMARY

According to one example aspect of the invention, an advanced driver assistance system (ADAS) for a vehicle is presented. In one exemplary implementation, the ADAS comprises a light detection and ranging (LIDAR) system configured to emit laser light pulses and capture reflected laser light pulses from a vehicle collectively forming three-dimensional (3D) LIDAR point cloud data for each of a plurality of frames and a controller configured to: receive the 3D LIDAR point cloud data, down-sample the 3D LIDAR point cloud data according to a user-configurable voxel size, filter the down-sampled 3D LIDAR point cloud data to remove data points corresponding to ground surface reflections, divide the 3D LIDAR point cloud data into a plurality of clusters that are parallel to the vehicle's moving direction, project the plurality of clusters to a plane that is parallel to sides of the vehicle to generate an image, detect a pole-shaped object in the image, and track the pole-shaped object by deep sorting across multiple frames of the plurality of frames.

In some implementations, the plurality of clusters are proximate to the sides of the vehicle. In some implementations, the controller is configured to divide the filtered 3D LIDAR point cloud data into the plurality of clusters according to at least one user-configurable cutting parameter. In some implementations, the at least one user-configurable cutting parameter includes at least one of thickness, stride, depth, and padding.

In some implementations, the controller is configured to track the pole-shaped object by incorporating motion information based on a squared Mahalanobis distance between predicted Kalman states and newly arrived measurements. In some implementations, the controller is configured to track the pole-shaped object by inserting the pole-shaped object into a matching cascade that gives priority to more frequently seen objects to monitor a tracked position of the pole-shaped object.

In some implementations, the controller is configured to track the pole-shaped object by predicting a position of the pole-shaped object using a standard Kalman filter with constant velocity motion and a linear observation model. In some implementations, the controller is configured to track the pole-shaped object based on a comparison between the tracked and predicted positions of the pole-shaped object.

In some implementations, the controller does not utilize a radio detection and ranging (RADAR) system or a camera system in detecting and tracking the pole-shaped object. In some implementations, the pole-shaped object is one of a light or utility pole, a traffic sign, and a tree.

According to another example aspect of the invention, a method of detecting and tracking a pole-shaped object proximate to a vehicle is presented. In one exemplary implementation, the method comprises: receiving, by a controller of the vehicle and from a LIDAR system of the vehicle, 3D LIDAR point cloud data for each of a plurality of frames captured the LIDAR system after emitting laser light pulses and capturing reflected laser light pulses, down-sampling, by the controller, the 3D LIDAR point cloud data according to a user-configurable voxel size, filtering, by the controller, the down-sampled 3D LIDAR point cloud data to remove data points corresponding to ground surface reflections, dividing, by the controller, the 3D LIDAR point cloud data into a plurality of clusters that are parallel to the vehicle's moving direction, projecting, by the controller, the plurality of clusters to a plane that is parallel to sides of the vehicle to generate an image, detecting, by the controller, a pole-shaped object in the image, and tracking, by the controller, the pole-shaped object by deep sorting across multiple frames of the plurality of frames.

In some implementations, the plurality of clusters are proximate to the sides of the vehicle. In some implementations, the dividing of the filtered 3D LIDAR point cloud data into the plurality of clusters is performed according to at least one user-configurable cutting parameter. In some implementations, the at least one user-configurable cutting parameter includes at least one of thickness, stride, depth, and padding.

In some implementations, the tracking of the pole-shaped object comprises incorporating motion information based on a squared Mahalanobis distance between predicted Kalman states and newly arrived measurements. In some implementations, the tracking of the pole-shaped object comprises inserting the pole-shaped object into a matching cascade that gives priority to more frequently seen objects to monitor a tracked position of the pole-shaped object.

In some implementations, the tracking of the pole-shaped object comprises predicting a position of the pole-shaped object using a standard Kalman filter with constant velocity motion and a linear observation model. In some implementations, the tracking of the pole-shaped object is performed based on a comparison between the tracked and predicted positions of the pole-shaped object.

In some implementations, the controller does not utilize a RADAR system or a camera system in detecting and tracking the pole-shaped object. In some implementations, the pole-shaped object is one of a light or utility pole, a traffic sign, and a tree.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, there exists a need for improvement in automated driver assistance (ADAS) systems that utilize radio detection and ranging (RADAR) and/or camera systems to detect and track pole-shaped objects. Accordingly, improved pole-shaped detection and tracking techniques are presented. The systems and methods described herein utilize light detection and ranging (LIDAR) to obtain high resolution three-dimensional (3D) point clouds over a plurality of frames that are then processed to accurately detect and track pole-shaped objects. This processing could include, for example, down-sampling to form a 3D voxel grid, ground surface reflection filtering the 3D voxel grid to obtain filtered 3D LIDAR point cloud data, dividing the filtered 3D LIDAR point cloud data into sub-clouds or clusters focusing on the sides of the vehicle and being parallel to the vehicle's moving direction, projecting each cluster to a plane that is parallel to the side of the vehicle to generate an image, performing pole-shaped object detection using the image, and performing tracking of the pole-shaped object(s) across multiple frames. The accurate detection and tracking of the pole-shaped object(s) could also be leveraged by other ADAS functions, such as, but not limited to, vehicle position localization on a map and/or collision avoidance during autonomous driving.

Figure 1:
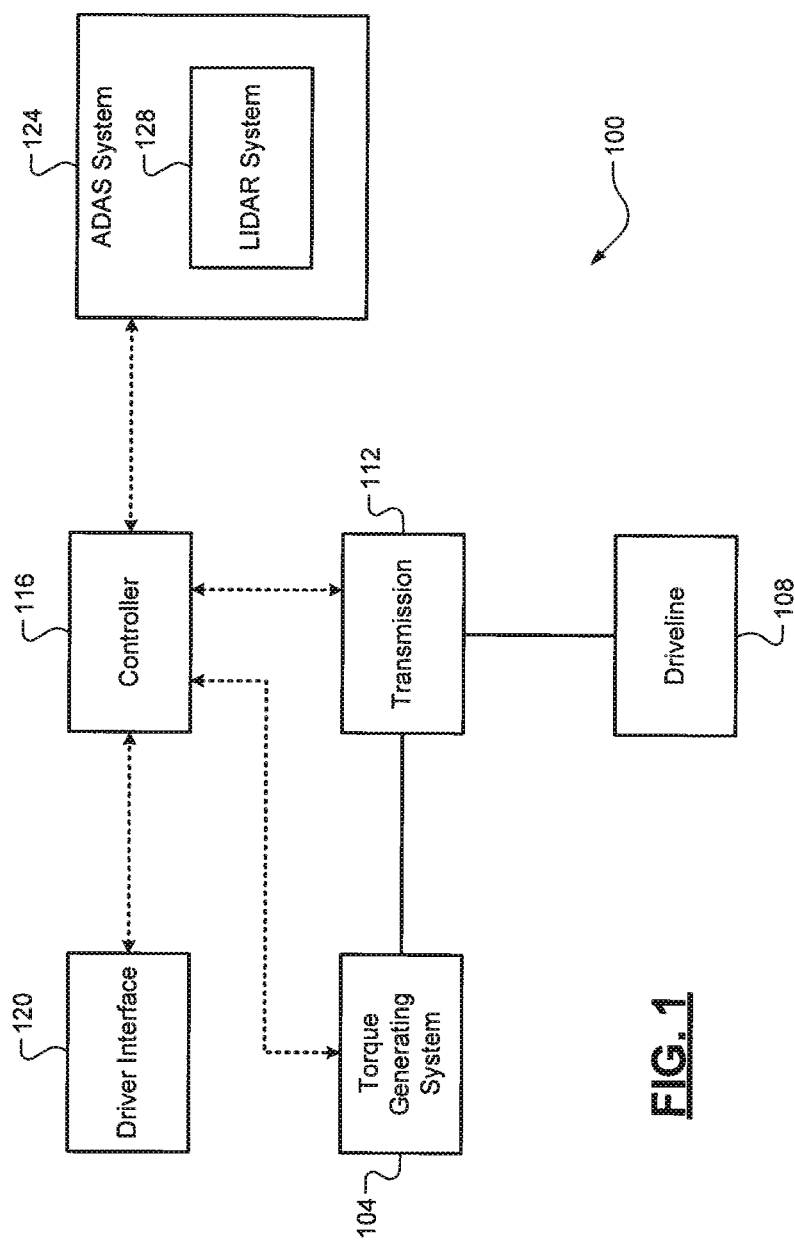
FIG. 1 is a functional block diagram of an example vehicle having an advanced driver assistance system (ADAS) with a light detection and ranging (LIDAR) system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a LIDAR system 128. While the ADAS 124 is illustrated as being separate from the controller 116, it will be appreciated that the ADAS 124 could be incorporated as part of the controller 116, or the ADAS 124 could have its own separate controller. The LIDAR system 128 emits laser light pulses and captures reflected laser light pulses (from other vehicles, pedestrians, pole-shaped objects, etc.) that collectively form captured 3D LIDAR point cloud data over a plurality of frames. Each frame, for example, could be indicative of a 3D LIDAR scan at a particular point in time. The plurality of frames could therefore represent a collection of 3D LIDAR scans over a period of time. It will be appreciated that the ADAS 124 could include other suitable systems, such as, but not limited to, a RADAR system, a camera/lens system, an inertial motion unit (IMU) system, a real-time kinematic (RTK) system, and the like.

Figure 2A:
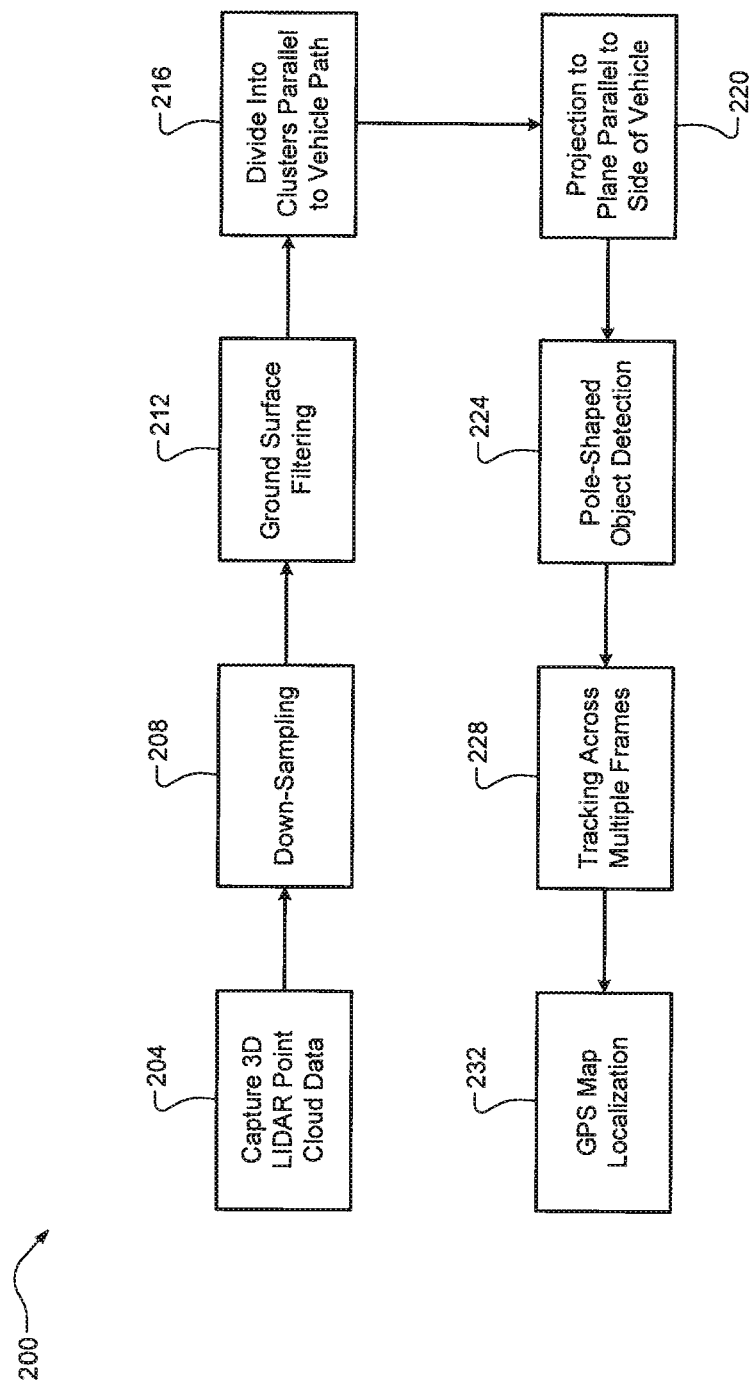
FIG. 2A is a functional block diagram of an example pole-shaped object detection and tracking architecture according to some implementations of the present disclosure.

Referring now to FIG. 2, a functional block diagram of an example pole-shaped object detection and tracking architecture 200 is illustrated. At 204, a plurality of frames of 3D LIDAR point cloud data is captured. At 208, the 3D LIDAR point cloud is down-sampled using a user-configurable voxel size. In one exemplary implementation, the user-configurable voxel size is 0.2 meters by 0.2 meters by 0.2 meters, but it will be appreciated that any suitable voxel size could be utilized. If more than one point in the 3D LIDAR point cloud data falls into a particular voxel, only one point will be used to represent the voxel. The down-sampled 3D LIDAR point cloud data can also be described as a 3D voxel grid. This down-sampling reduces real-time computational load, thereby increasing the speed of the pole-shaped object detection and tracking process and/or allowing for the use of a less powerful and less expensive controller.

At 212, ground surface reflection filtering is performed on the down-sampled 3D LIDAR point cloud data. It will be appreciated that steps 208 and 212 could occur as a single operation. In one exemplary implementation, the ground surface reflection filtering comprises generating histogram including a height difference between maximum and minimum heights (z-coordinates) of the down-sampled 3D LIDAR point cloud data for each cell of a plurality of cells surrounding the vehicle. Very small height differences are likely indicative of that down-sampled 3D LIDAR point cloud data corresponding to a ground surface. The histogram data is therefore analyzed to determine a height threshold indicative of a ground surface. This height threshold could be dynamic in that it is repeatedly recalculated for different scenes. Any points in the down-sampled 3D LIDAR point cloud data having heights (z-coordinates) less than this height threshold could then be removed from the down-sampled 3D LIDAR point cloud data (thereby obtaining filtered 3D LIDAR point cloud data) or otherwise ignored. The removal or ignoring of any data that is likely a ground surface allows for faster processing and/or a less expensive controller due to the smaller dataset.

Figure 2B:
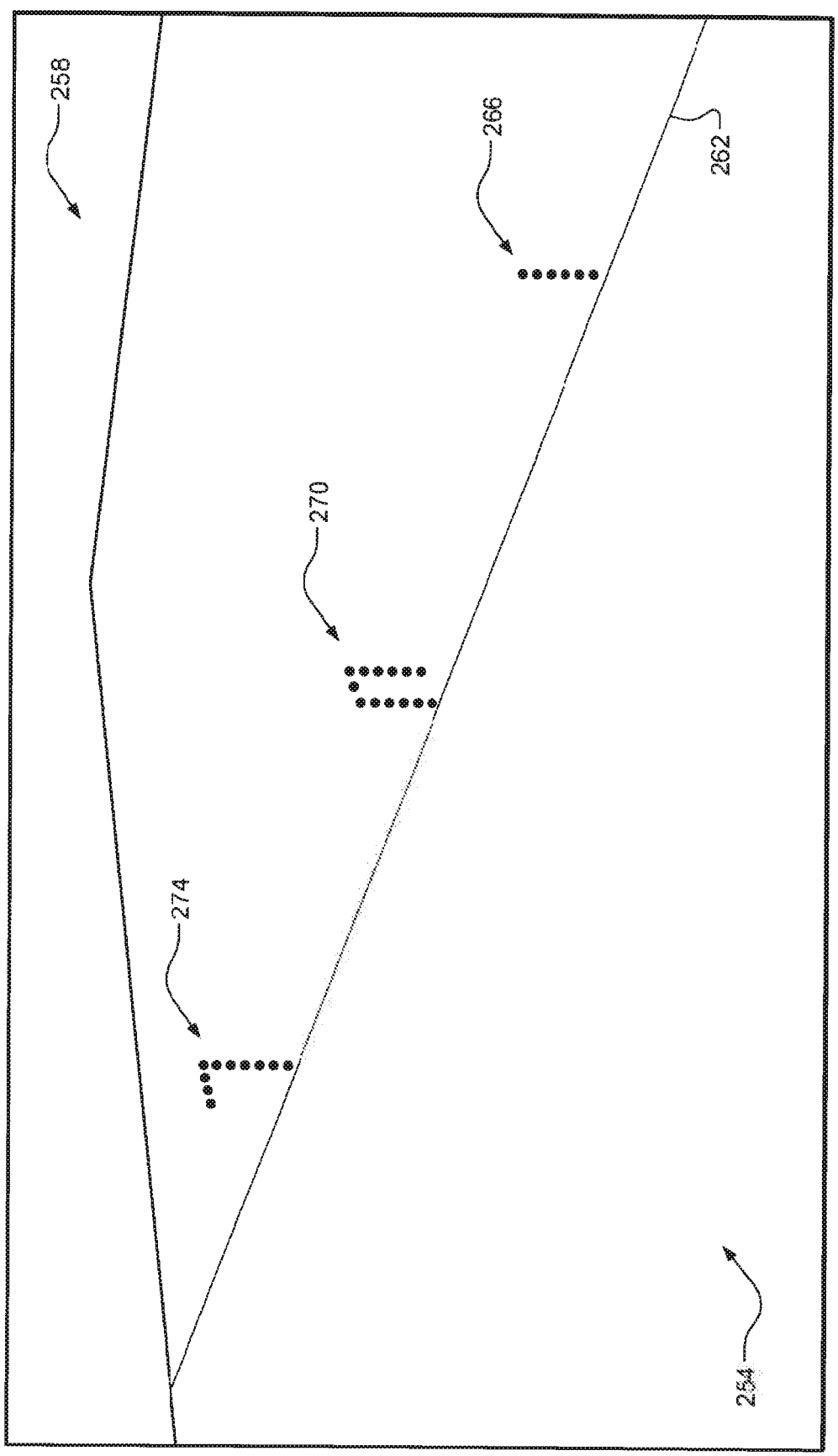
FIG. 2B is example three-dimensional (3D) LIDAR point cloud data processed for pole-shape object detection and tracking.

At 216, the filtered 3D LIDAR point cloud data is cut or sliced into sub-point clouds or clusters to further improve the accuracy of object detection accuracy. In one exemplary implementation, the cutting focuses on both sides of the vehicle. For each side, the filtered 3D LIDAR point cloud data is cut into slices that are parallel to the vehicle's moving direction. The thickness of each slice and other cutting parameters are user-configurable and could be finely tuned for each application. Other non-limiting examples of the cutting parameters include stride, depth, and padding. At 220, each slide is projected to a plane that is parallel the side of the vehicle 100 thereby generating an image that can be used for object detection. FIG. 2B illustrates an example of such an image where 3D LIDAR point cloud data 250 has been down-sampled, filtered to remove reflections from a ground surface 254 that is separate from a sky region 258, cut into sub-clouds/clusters/slices, and projected to the plane that is parallel to the vehicle 100. Along the vehicle's moving direction 262, there are three different pole-shaped objects. For example only, object 266 could be a utility pole or tree, object 270 could be a traffic sign, and object 274 could be a light pole. It will be appreciated that this example data is only for illustration and is not drawn to scale.

After projection at 220, the generated image can then be processed to detect pole-shaped objects at 224. Any suitable object detection technique could be utilized, such as, for example only, connected component labeling or another suitable Open Source Computer Vision Library (OpenCV) object detection technique. At 228 the detected pole-shaped object(s) are tracked. In some implementations, a state of each detected object is labeled for each frame as part of the tracking procedure. Non-limiting examples of the possible states include creation, tracking, hiding, and dropping. In some implementations, the detection and tracking of the pole-shaped object(s) involves the use of a Kalman filter with constant velocity and motion and a linear observation model. This performs well because pole-shaped objects can be assumed to be rigid and static. It will be appreciated that 3D to 2D (e.g., birdview) projection could also be performed and then lines (i.e., connected pixels) indicative of pole-shaped objects could be detected.

In some implementations, the tracking of the pole-shaped object(s) comprises a deep-sorting procedure. This deep-sorting procedure adopts a conventional single hypothesis tracking methodology with recursive Kalman filtering and frame-by-frame data association. This deep-sorting procedure can be divided into four sub-components: assignment, matching cascade, state estimation, and prediction. For each frame, detected pole-shaped objects are assigned by incorporating motion information. This can include, for example, calculating a squared Mahalanobis distance between predicted Kalman states and newly arrived measurements. In some implementations, this further includes a second metric that measures the smallest cosine distance between the i-th track and the j-th detection in the appearance space. The assigned objects are then inserted into a matching cascade across the multiple frames, e.g., to overcome at least one of occlusion, hiding, and reformation.

For state estimation, new tracking hypotheses are initiated for each detected pole-shaped object that cannot be associated to an existing track. During a first number of frames (e.g., three frames), a successful measurement association at each time step is expected. Thus, tracks that are not successfully associated to a measurement within this first number of frames are deleted. Using this matching cascade, a tracked position for each pole-shaped object is monitored across the multiple frames. This matching cascade also utilizes a predicted position of each object. This prediction involves a standard Kalman filter with constant velocity motion and a linear observation model, which performs very well for vehicle applications where static (i.e., non-moving) objects are being monitored. Bounding coordinates of each pole-shaped object are taken as direct observations of the object state. For example, a center point coordinate for each bounding box, its aspect ratio, and its height are utilized as the coordinates, and the position of each pole-shaped object is predicted using these coordinates and the above-mentioned filter/model.

Lastly, at 228, the detection and tracking of the pole-shaped objects is optionally leveraged for other ADAS functions. For example only, by accurately knowing the location of static pole-shaped objects at all times, the position of the vehicle 100 could be more accurately determined. This could be used, for example, to better localize the position of the vehicle 100 on a global positioning system (GPS) map, such as one displayed on a driver interface of the vehicle. It will be appreciated that the detection and tracking of the pole-shaped object(s) could also be used as part of other ADAS features, such as collision avoidance during autonomous driving.

Figure 3:
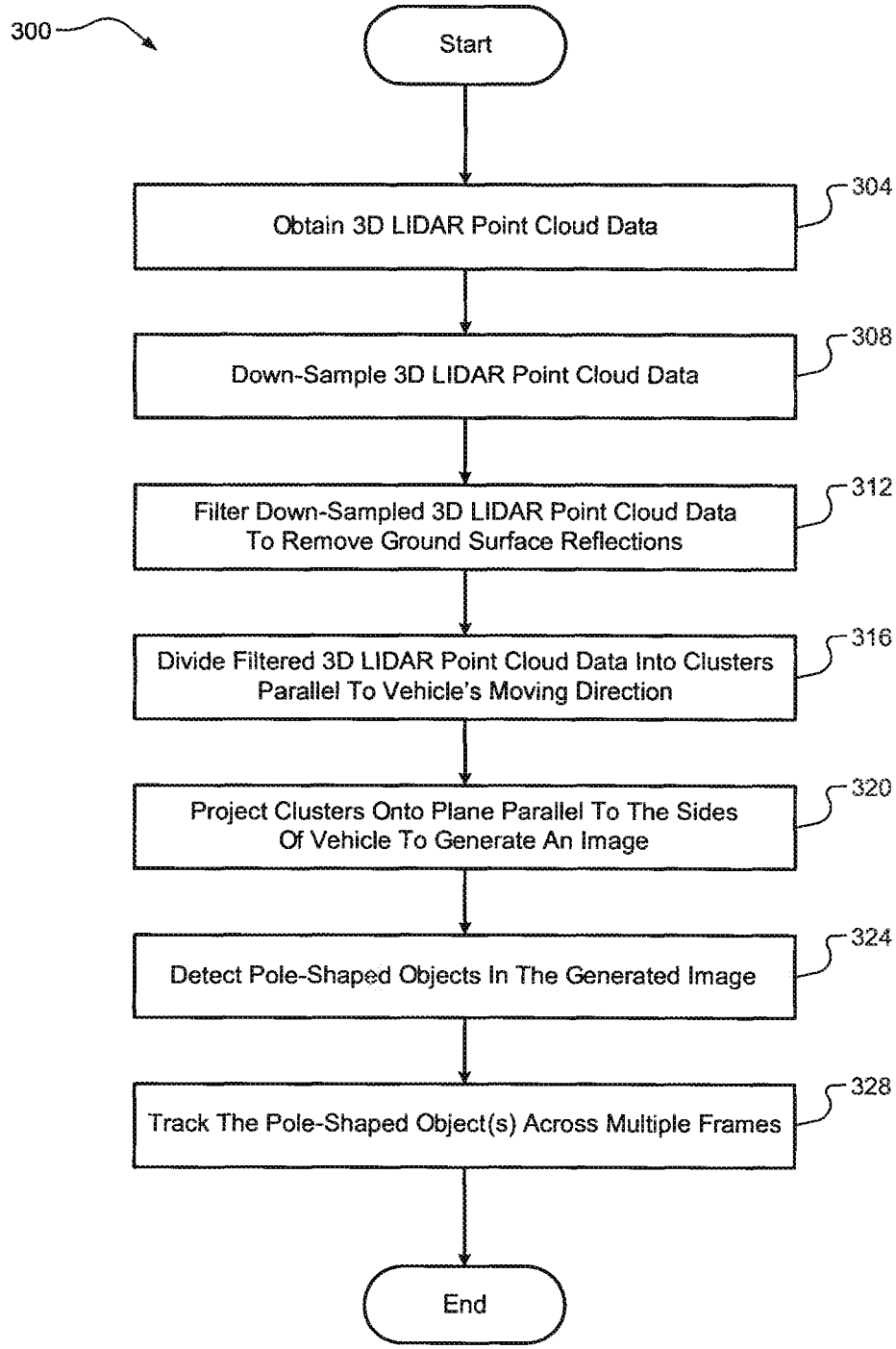
FIG. 3 is a flow diagram of an example pole-shaped object detection and tracking method according to some implementations of the present disclosure.

Referring now to FIG. 3, a flow diagram of a pole-shaped object detection and tracking method 300 is illustrated. It will be appreciated that this method 300 could be implemented by the controller 116, by the ADAS system 124 itself, or in some combination thereof. At 304, 3D LIDAR point cloud data over a plurality of frames is obtained, e.g., from the LIDAR system 128. At 308, the 3D LIDAR point cloud data is down-sampled (e.g., forming a 3D voxel grid). At 312, the down-sampled 3D LIDAR point cloud data is filtered to remove ground surface reflections. It will be appreciated that other filtering could be performed to remove data points that are likely not indicative of pole-shaped objects. Velocity-based filtering could be used, for example, because pole-shaped objects are static. At 316, the filtered 3D LIDAR point cloud data is cut or sliced into sub-clouds or clusters focusing on the sides of the vehicle and that are parallel to the vehicle's moving direction. At 320, the sub-clouds/clusters/slices are projected to a plane that is parallel to the sides of the vehicle 100. At 324, pole-shaped object(s) are detected in the projected sub-clusters and are then tracked at 328 across multiple frames. It will be appreciated that another step (e.g., step 332, not shown) could involve the use of the detected and tracked pole-shaped objects as part of other ADAS features. The method 300 then ends or returns to 304.

It will be appreciated that the term "controller" as used herein refers to any suitable control device or set of multiple control devices that is/are configured to perform at least a portion of the techniques of the present disclosure.

Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a ground vehicle, the ADAS comprising:
   a light detection and ranging (LIDAR) system configured to emit laser light pulses and capture reflected laser light pulses from the ground vehicle collectively forming three-dimensional (3D) LIDAR point cloud data for each of a plurality of frames; and
   a controller configured to:
   receive the 3D LIDAR point cloud data;
   down-sample the 3D LIDAR point cloud data according to a user-configurable voxel size to reduce a size of the 3D LIDAR point cloud data and decrease a real-time computational load for at least one of increased processing throughput and increased speed of pole-shaped object detection and tracking;

filter the down-sampled 3D LIDAR point cloud data to remove data points corresponding to ground surface reflections;

divide the filtered 3D LIDAR point cloud data into a plurality of clusters that only include filtered 3D LIDAR point cloud data that is parallel to the ground vehicle's moving direction along a surface and within a configurable distance away from the ground vehicle;

project the plurality of clusters to a plane that is parallel to sides of the ground vehicle to generate an image;

detect a pole-shaped object in the image using an image-based object detection technique; and track the pole-shaped object by deep sorting across multiple frames of the plurality of frames.

2. The ADAS of claim 1, wherein the plurality of clusters are proximate to the sides of the vehicle.

3. The ADAS of claim 2, wherein the controller is configured to divide the filtered 3D LIDAR point cloud data into the plurality of clusters according to at least one user-configurable cutting parameter.

4. The ADAS of claim 3, wherein the at least one user-configurable cutting parameter includes at least one of thickness, stride, depth, and padding.

5. The ADAS of claim 1, wherein the controller is configured to track the pole-shaped object by incorporating motion information based on a squared Mahalanobis distance between predicted Kalman states and newly arrived measurements.

6. The ADAS of claim 5, wherein the controller is configured to track the pole-shaped object by inserting the pole-shaped object into a matching cascade that gives priority to more frequently seen objects to monitor a tracked position of the pole-shaped object.

7. The ADAS of claim 6, wherein the controller is configured to track the pole-shaped object by predicting a position of the pole-shaped object using a standard Kalman filter with constant velocity motion and a linear observation model.

8. The ADAS of claim 7, wherein the controller is configured to track the pole-shaped object based on a comparison between the tracked and predicted positions of the pole-shaped object.

9. The ADAS of claim 1, wherein the controller does not utilize a radio detection and ranging (RADAR) system or a camera system in detecting and tracking the pole-shaped object.

10. The ADAS of claim 1, wherein the pole-shaped object is one of a light or utility pole, a traffic sign, and a tree.

11. A method of detecting and tracking a pole-shaped object proximate to a ground vehicle, the method comprising:

receiving, by a controller of the vehicle and from a light detection and ranging (LIDAR) system of the vehicle, three-dimensional (3D) LIDAR point cloud data for each of a plurality of frames captured the LIDAR system after emitting laser light pulses and capturing reflected laser light pulses;

down-sampling, by the controller, the 3D LIDAR point cloud data according to a user-configurable voxel size to reduce a size of the 3D LIDAR point cloud data and decrease a real-time computational load for at least one of increased processing throughput and increased speed of pole-shaped object detection and tracking;

filtering, by the controller, the down-sampled 3D LIDAR point cloud data to remove data points corresponding to ground surface reflections;

dividing, by the controller, the filtered 3D LIDAR point cloud data into a plurality of clusters that only include filtered 3D LIDAR point cloud data that is parallel to the ground vehicle's moving direction along a surface and within a configurable distance away from the ground vehicle;

projecting, by the controller, the plurality of clusters to a plane that is parallel to sides of the ground vehicle to generate an image;

detecting, by the controller, a pole-shaped object in the image using an image-based object detection technique; and tracking, by the controller, the pole-shaped object by deep sorting across multiple frames of the plurality of frames.

12. The method of claim 11, wherein the plurality of clusters are proximate to the sides of the vehicle.

13. The method of claim 12, wherein the dividing of the filtered 3D LIDAR point cloud data into the plurality of clusters is performed according to at least one user-configurable cutting parameter.

14. The method of claim 13, wherein the at least one user-configurable cutting parameter includes at least one of thickness, stride, depth, and padding.

15. The method of claim 11, wherein the tracking of the pole-shaped object comprises incorporating motion information based on a squared Mahalanobis distance between predicted Kalman states and newly arrived measurements.

16. The method of claim 15, wherein the tracking of the pole-shaped object comprises inserting the pole-shaped object into a matching cascade that gives priority to more frequently seen objects to monitor a tracked position of the pole-shaped object.

17. The method of claim 16, wherein the tracking of the pole-shaped object comprises predicting a position of the pole-shaped object using a standard Kalman filter with constant velocity motion and a linear observation model.

18. The method of claim 17, wherein the tracking of the pole-shaped object is performed based on a comparison between the tracked and predicted positions of the pole-shaped object.

19. The method of claim 11, wherein the controller does not utilize a radio detection and ranging (RADAR) system or a camera system in detecting and tracking the pole-shaped object.

20. The method of claim 11, wherein the pole-shaped object is one of a light or utility pole, a traffic sign, and a tree.

* * * * *